(12) United States Patent
Geus et al.

(10) Patent No.: US 9,101,880 B2
(45) Date of Patent: Aug. 11, 2015

(54) PROCESS AND REACTOR FOR REMOVING ORGANIC COMPOUNDS FROM GAS FLOWS

(76) Inventors: John Wilhelm Geus, Bilthoven (NL); Marinus Franciscus Johannes Evers, Eindhoven (NL)

( * ) Notice: Subject to any disclaimer, the term of this patent is extended or adjusted under 35 U.S.C. 154(b) by 1021 days.

(21) Appl. No.: 13/203,291

(22) PCT Filed: Feb. 25, 2010

(86) PCT No.: PCT/NL2010/050096
§ 371 (c)(1),
(2), (4) Date: Oct. 20, 2011

(87) PCT Pub. No.: WO2010/098665
PCT Pub. Date: Sep. 2, 2010

(65) Prior Publication Data
US 2012/0039781 A1    Feb. 16, 2012

(30) Foreign Application Priority Data
Feb. 25, 2009   (EP) ..................... 09153651

(51) Int. Cl.
*B01D 53/56*   (2006.01)
*B01D 53/88*   (2006.01)

(52) U.S. Cl.
CPC ...... *B01D 53/885* (2013.01); *B01D 2255/1021* (2013.01); *B01D 2255/1023* (2013.01); *B01D 2257/302* (2013.01); *B01D 2257/306* (2013.01); *B01D 2257/708* (2013.01); *B01D 2257/90* (2013.01)

(58) Field of Classification Search
CPC .......... B01D 53/56; B01D 53/72; B01J 8/00; C07C 11/24
USPC ..................................... 423/245.3
See application file for complete search history.

(56) References Cited

U.S. PATENT DOCUMENTS

| | | | |
|---|---|---|---|
| 4,795,618 | A | 1/1989 | Laumen |
| 2009/0010801 | A1 | 1/2009 | Murphy et al. |

FOREIGN PATENT DOCUMENTS

| | | |
|---|---|---|
| EP | 0922666 | 6/1999 |
| FR | 2837810 | 10/2003 |
| JP | 53033974 | 3/1978 |
| WO | 8602016 | 4/1986 |
| WO | 9005577 | 5/1990 |
| WO | 9919456 | 4/1999 |
| WO | 2007005255 | 1/2007 |

OTHER PUBLICATIONS

International Search Report, Application No. PCT/NL2010/050096, mailed May 10, 2010.
Patel et al.; "Dynamic behaviour of methane heat exchange reformer for residential fuel cell power generation system"; Journal of Power Sources; vol. 161, No. 1, Oct. 20, 2006; pp. 503-512.

*Primary Examiner* — Edward Johnson
(74) *Attorney, Agent, or Firm* — Renner, Otto, Boisselle & Sklar, LLP

(57) ABSTRACT

The present invention is directed to a process and a reactor for removing organic compounds from gas flows, in which process the said gas flow is passed through a first compartment of a multi-compartment reactor, which reactor comprises at least one first compartment and at least one second compartment, which first and second compartments are in heat exchanging relationship with each other through a joint, gastight wall, and in which first compartment the gas flow is heated by heat exchange with the said second compartment, passing the heated gas flow to the second compartment, further heating the gas flow entering the second compartment either by adding additional combustible gas or electric heating, and passing the heated gas through the second compartment over a catalytic oxidation catalyst to combust the organic compounds, whereby both the first and the second compartment are filled with porous sintered metal material, which is in heat exchanging relationship to the said joint wall, whereby the metal material in the second compartment is provided with the said oxidation catalyst.

10 Claims, 11 Drawing Sheets

Figure 1:
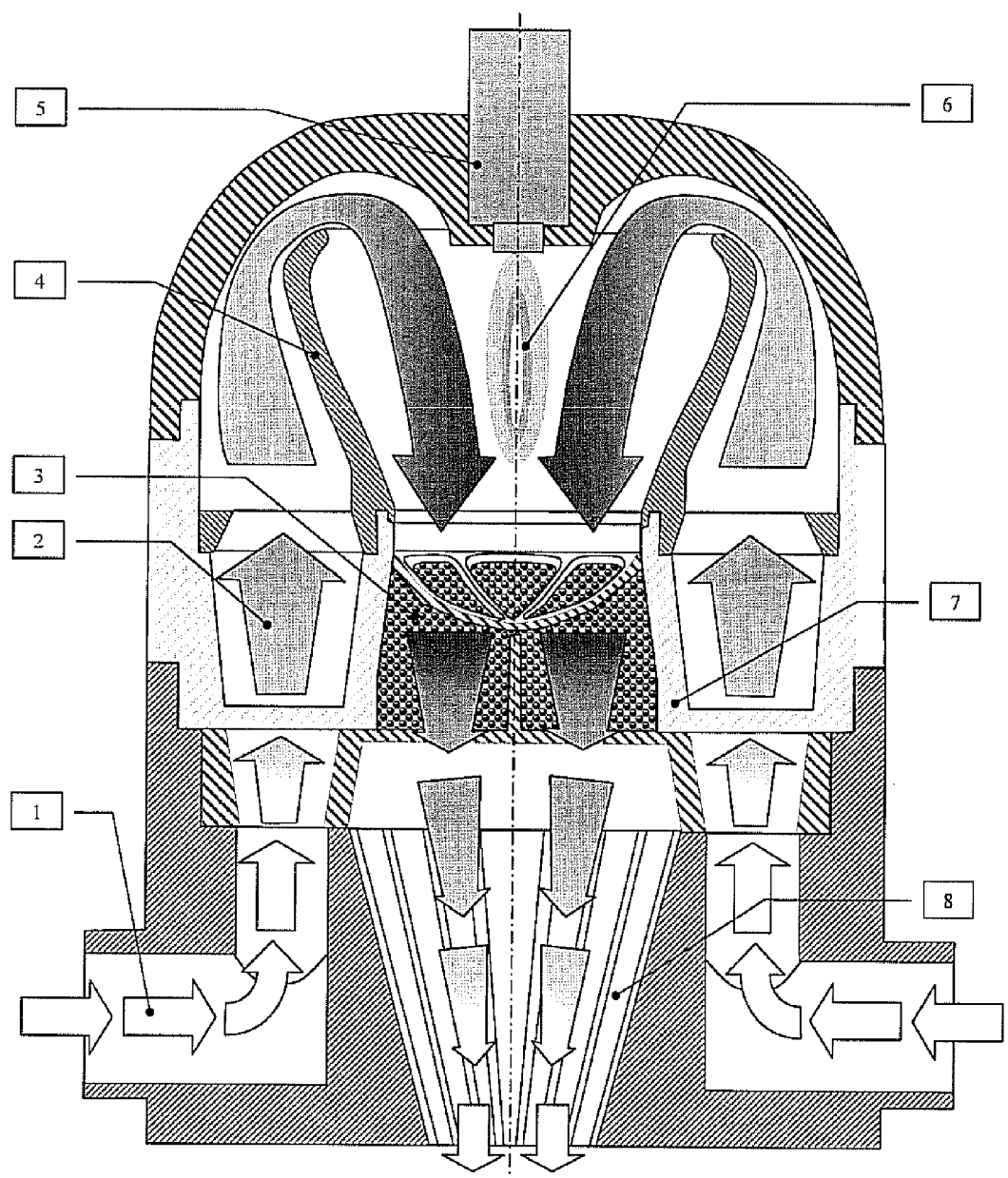

3 Nesting bal chain
9 Bal chain
10 Bal chain nesting structure
11 Chain lead-in

7 Heat exchange device 1
12 Extra heat exchange surface structure

16 Electric Heater filament
4 Gas leading cup

7 Heat exchange device 1
12 Extra heat exchange surface structure
17 Nested bal chain, outside ring 18 Heat exchange device 1, reverse flow

PROCESS AND REACTOR FOR REMOVING ORGANIC COMPOUNDS FROM GAS FLOWS

The present invention is directed to a process for the removal of organic compounds from gas flows by catalytic decomposition or burning, and to a reactor suitable for this process.

It is known to convert undesired components from gas flows by oxidation into less or non harmful compounds. An example thereof is the oxidation of volatile organic compounds to carbon dioxide and water. Gaseous organic compounds are often poisonous, such as organic oxygen containing solvent, for example methyl isobutyl keton, methyl ethyl keton and dimethyl keton. Organic compounds often also have an undesired smell or a smell which is not unacceptable, but to which one does not want to be exposed for a long time. Oxidation of such organic compounds, also known as VOC (volatile organic compounds), results in carbon dioxide and water which are not poisonous and do not smell. A special case of volatile organic compounds are the sulphur containing compounds, such as mercaptanes. These compounds, which for example occur in sewer gases, have a very nasty smell. Oxidation converts them to carbon dioxide, water and sulphur dioxide. The sulphur dioxide can only be smelled in much higher concentrations, so that it is possible to prevent serious smell problems by oxidation of sulphur compounds in gas flows.

Further, important components in gas flows, which can be very harmful, are formed by viruses and bacteria. Purification of gas flows by oxidation of viruses and bacteria would be very attractive in many cases. Also the removal of dust particles which may give rise to allergic reactions is of in importance herein.

A major problem in the purification of gas flows by oxidation is the fact that the gas flow has to be raised to a sufficiently high temperature. In general, oxidation requires temperatures of 800° C. or more. It is clear that the whole of the gas flow has to be brought to such a temperature to oxidize the, often minor, amount of harmful compounds. The heat of combustion of these harmful components is insufficient to bring the gas flow to the required temperature. It is has been proposed to lead a gas flow that has to be purified through a flame. In U.S. Pat. No. 4,444,735, equipment is described wherein the gas flow to be treated is passed through a flame front. The flame is obtained by the burning of fossil fuels. To get complete burning, a heat exchanger has to be used to bring the gas flow to a sufficient high temperature before passing it through the flame.

In order to reduce the amount of fuel for the purification, one tries to recover as much thermal energy from the purified gas flow as possible.

According to the present technology a so-called reverse flow technique is used. On both sides of the actual burning equipment, a bed of ceramic material is present, wherein the thermal energy of the purified gas flow is stored. The temperature of the gas flow entering the equipment is raised by passing it to through the previously heated ceramic bed at one side of the equipment. After passing through the flame, the gas flow passes through the ceramic material at the other side, so that part of the thermal energy of the gas flow is stored in the ceramic material.

The temperature of the ceramic material decreases when the thermal energy is transferred to the gas flow. When the temperature has dropped below a predetermined level, the incoming gas flow is switched to the other side of the equipment where the ceramic material has been heated. It is clear that this type of equipment is quite complicated and large, requiring a lot of measuring and control equipment. In U.S. Pat. Nos. 3,870,474 and 4,741,690 such reverse flow reactors for the removal of impurities or unwanted smells have been described. The equipment described herein requires two or more beds filled with inert material to store the thermal energy from the treated gas flows. During switching untreated gas is emitted, which is undesirable. In U.S. Pat. No. 3,870,474 it is suggested to prevent the emission of untreated gas during switching by leading the gas through a third regenerator.

An active oxidation catalyst, such as platinum or palladium oxide can be used to oxidize noxious compounds at a much lower temperature. Still a temperature of at least 200° C. is needed. Even for obtaining such a temperature, the heat of combustion of the impurities present in the gas flow is insufficient. It is possible to solve this problem by adding fuel gas to the gas flow. This increases the costs of the process. In order to minimize the use of fuel gas, a reverse flow technique is also used herein.

In the same manner as in equipment for purely thermal oxidation the gas flow is usually fed at one side of the catalyst bed, together with a fuel gas. This causes a temperature gradient in the catalyst bed wherein the temperature increases in the downstream direction. In this way the heat of combustion is stored in the catalyst bed. After a suitable period the direction of the gas flow in the catalyst bed is reversed, so that the gas flow enters the catalyst bed at the location of the highest temperature. In this way the gas flow is heated to the minimal combustion temperature of the catalyst. During this period the temperature profile of the catalyst changes gradually, resulting therein that the maximal temperature is again obtained at the exit of the catalyst bed. At that time the direction of the gas flow is reversed again. This process is called a regenerative incinerator system, as the thermal energy present in the treated gas is recovered as much as possible. In U.S. Pat. Nos. 4,478,808 and 4,877,592 this process is described.

Although the reverse flow technique is used quite a lot, it certainly has serious drawbacks. In the first place, a relatively large amount of equipment is needed to realize the reverse flow. This technique requires valves and measuring equipment to reverse the gas flow. As the thermal energy has to be stored in the catalyst bed, it has to be relatively large. And finally quite a lot of thermal energy is lost as the treated gas flow leaves the catalyst bed at a high temperature.

Accordingly it is an object of the invention to provide a process for removing organic compounds from gas flows, especially in low concentrations, which does not have the above disadvantages. More in particular, it is an object to provide a process, wherein the energy requirements are low, and which process can be applied at small or large scale, depending on the requirements.

The present invention is based on the use of specific heat exchanging equipment, namely based on porous sintered metal materials, which are brought into specific heat exchanging relationships.

The invention is directed to a process for removing organic compounds from gas flows, in which process the said gas flow is passed through a first compartment of a multi-compartment reactor, which reactor comprises at least one first compartment and at least one second compartment, which first and second compartments are in heat exchanging relationship with each other through a joint, gas-tight wall, and in which first compartment the gas flow is heated by heat exchange with the said second compartment, passing the heated gas flow to the second compartment, further heating the gas flow entering the second compartment either by adding additional combustible gas or electric heating, and passing the heated gas through the second compartment over a catalytic oxidation catalyst to combust the organic compounds, whereby both the first and the second compartment are filled with porous sintered metal material, which is in heat exchanging relationship to the said joint wall, whereby the metal material in the second compartment is provided with the said oxidation catalyst.

According to the invention the thermal energy present in the second compartment, in that catalyst bed, is transferred through the gas tight wall to the incoming gas flow. As the thermal energy need not be stored, the equipment can be much smaller.

In WO 86/02016 a heat exchanger is described, which based on a porous metal body. According to this publication two porous metal bodies have been applied on both sides of a thermally conducting, non-porous, gas tight layer. The process according to this publication is directed to carrying out an actual thermal catalytic reaction on the surface of one of the porous metal bodies, whereas in the other compartment a suitable liquid is vaporized. Additional energy is recovered from the gas flow by applying cooling means after the catalytic active body, wherein the tangible thermal energy of the gas flow and the condensation energy of the condensable gases present in the gas flow can be recovered. A specific reaction is the oxidation of fuel gas or synthesis gas.

According to U.S. Pat. No. 5,366,719, the thermal conductance of two sintered metal bodies which are in a relationship as described above in WO 86/02016 is so high, that the catalyst cannot be kept at the minimal temperature necessary for oxidation. According to this patent it is proposed to apply a sintered metal body at one side of a gas tight, thermally conducted metal wall and to have the vaporisation occur at the other side of the wall, without any sintered metal being present there.

It is noted that WO 2007/005255 relates to a method for producing a gas stream comprising hydrogen comprising partially oxidizing a first fuel and an oxidant in a catalytic partial oxidation zone or in an ATR zone to produce a first reformate stream-comprising hydrogen; mixing said first reformate stream with a second fuel and steam to produce a mixed stream; and steam reforming said mixed stream in a steam-reforming zone to produce a second reformate stream comprising hydrogen. However, a process for removing organic compounds from gas flows wherein the gas flow is passed through compartments filled with porous sintered metal material is not disclosed. In fact a so called steam reforming process, as described in WO 2007/005255 typically requires much higher temperatures than a method according to the invention. Further, such process is generally not carried out using a gas stream wherein organic compounds only form a minor fraction of the total contents, as the case may be in a process according to the invention, wherein e.g. a gas is treated wherein organic compounds form less than 20 wt. %, less than 1 wt. %, less than 0.1 wt. % of the total gas. The concentration of organic compounds may be as low as a 0.001 wt. % or even lower.

The present invention is based on the use of a reactor system, comprising at least two compartments, which are present on opposite sides of a gas tight, thermally conducting (usually metal) wall, whereby both compartments have been filled with porous sintered metal material. More in particular, the sintered metal material comprises sintered metal fibres or sintered metal spheres. The gas to be treated is first passed through the first compartment, wherein it is heated by the heat generated in the second compartment. From the first compartment the gas is then transferred to the second compartment.

Surprisingly it has been found that the heat transfer from the second compartment to the gas flow to be purified in the first compartment is such that the temperature in the second compartment does not drop below the minimal required temperature. In this respect it is important that the minimum temperature is selected in such a way that a relative low temperature of about 200° C. is sufficient to complete oxidize the contaminants.

The oxidation catalyst may in particular be selected from precious metals, such as platinum, palladium and combinations thereof. Also suitable is copper, which may optionally be used in combination with one or more precious metals.

According to a first embodiment of the present invention, additional gas from a burner is mixed with the gas flow to be treated, generally between the first and second compartment. The ratio of the two gas flows is such that the heat of the gas from the burner is sufficient to bring the total gas flow to the temperature needed for the catalytic combustion for the impurities in the gas flow. The actual minimal temperature is also determined by the nature of the catalyst in the second compartment.

In a specific embodiment of the invention the heating element is a gas burner that is fed with a fuel gas, such as methane. On locations where there is no natural gas, such as methane, it is possible to use liquefied petroleum gas or butane. When the gas flow to be treated only is liberated at certain moments of time, such as sewer gas that only is liberated when the sewer becomes filled with water, the fuel gas can be admitted using an electrical switch and in electrical combustion.

According to a second embodiment of the invention such an amount of fuel gas is mixed with the gas flow to be purified, so that catalytic oxidation of the fuel in the catalyst bed, the temperature is such that also the contaminants in the gas flow to be purified are being oxidized. In a special embodiment the catalyst and the heat exchanger have been separated. During oxidation of the fuel gas, such as methane, the minimum temperature of the oxidation catalyst will generally be higher than needed for oxidation of impurities in the gas flow. According to this second aspect of the invention a normal catalyst bed is used wherein an active component on a support is present. In this case downstream of the catalyst bed there is a porous metal body in suitable thermal contact with the gas tight wall. On the other side of the gas tight wall the first compartment with sintered metal is present. In this way the gas flow to be purified is preheated very efficiently.

Instead of a suitable fixed catalyst bed it is also possible to use one or more metal gauzes, either of a metal which itself is an active oxidation catalyst, such as platinum or palladium, or a metal gauze having applied thereto the catalytically active component. The latter embodiment has the advantage of economic savings in the amount of catalytically active component needed.

An advantage of a metal gauze is that the reaction can be initiated by heating the gauze electrically. In that case the heating element and the catalyst are combined by the use of an electrically heated gauze.

According to a third aspect of the invention use is made of electrical heating of the gas flow to be treated. An advantage of electrical heating is that such a heating element can be adjusted by accurately. Further, it allows a flameless operation, which may be required under certain conditions.

Various different embodiments of electrical heating elements may be used, such as a resistance wire or an inductively heated metal wire (copper). Preference is given to an electrically heated gauze. Especially for the purification of relatively small gas flows, electrical heating is very attractive. The equipment can be adjusted very well, whereas the consumption of electrical energy for small gas flows is relatively low.

The present invention is also directed to a reactor suitable for use in the process of the invention, comprising comprises at least one first compartment and at least one second compartment, which first and second compartments are in heat exchanging relationship with each other through a joint, gastight wall, and in which first compartment a gas flow can heated by heat exchange with the said second compartment, means for passing the heated gas flow from the first compartment to the second compartment, and wherein means are present for further heating the gas flow entering the second compartment either by adding additional combustible gas or electric heating, the second compartment being provided with a catalytic oxidation catalyst to combust the organic compounds, whereby both the first and the second compartment are filled with porous sintered metal material, which is in heat exchanging relationship to the said joint wall, whereby the surface of the metal material in the second compartment is catalytically active for the said oxidation.

The reactor used according to the present invention can be produced using known technology for sintering metals. According to a preferred embodiment, it is possible to start from metal wires or fibres. Nickel wires with a diameter of 50 to 500 μm are commercially available. These fibres may be processed into a porous metal body by dispersing a mixture of such wires and paper or cotton fibres in water. After good mixing that dispersion may be filtered through the reactor followed by treatment at elevated temperature in a hydrogen containing gas stream. The paper or carbon fibres are decomposed and a highly porous stack of metal particles filling the reactor in a homogenous manner is obtained. The decomposition of organic fibres occurs at a lower temperature than the melting of an aluminum or the aluminum alloy which brings the thermal contacts between the metal wires themselves and the reactor wall.

It is also possible to start from metal powders, such as those that are obtained by bringing molten metal in a water flow. Copper and bronze metals are commercially available as spheres. The reactor may be filled with such a powder, followed by sintering thereof. The metal particles are brought into mutual thermal contact and in thermal contact with the reactor wall. The sintering can be done by heating the lose stacking of metal spheres in a reducing gas flow. The temperature required for this depends on the metal or metal alloy. For copper or bronze bodies a temperature of about 300 to 400° C. suffices. Aluminum, of which the oxide cannot be thermally reduced, can be sintered in a strong vacuum at 600 to 700° C. The aluminum weakens, whereby the weight of the aluminum bodies pushes the oxide layer on the surface away and a metallic connection between the aluminum bodies is obtained. For the use of iron spheres a much higher temperature is heated, namely about 1100° C. Stainless steel is rather difficult to sinter, as the chromium oxide on the surface is difficult to reduce with hydrogen to the corresponding alloy. Generally, the stainless steel will first be pressed into the reactor, whereby the oxide layer is removed at the contact spots and subsequently it is possible to sinter at about 1100° C.

An advantage of an embodiment wherein the catalytically active component is present on the surface of the sintered metal lies therein that a relatively short catalyst bed suffices to obtain sufficient conversion. As the catalyst bed has been sintered to the reactor wall, no short-circuiting of the gas flow along the wall of the reactor can take place. In the usual fixed catalyst bed the catalyst body has a bad connection to the reactor wall, resulting in a low gas resistance along the reactor wall. A part of the gas flow will accordingly preferably flow along the catalyst wall, requiring a relatively long catalyst bed for full conversion.

According to a preferred embodiment a standard fixed catalyst bed is applied in the upstream area of the porous metal which functions as heat exchanger. Also a relatively short fixed catalyst bed can then be used for obtaining full conversion.

Applying the catalyst to the surface of the porous sintered metal body can be done using standard technology. Reference is made to the international patent applications WO99/05342, WO00/20106 and WO 00/43572, the contents of which is incorporated herein by way of reference.

When using a large reactor, the weight of the porous metal body of metal spheres can become a problem. In most cases a small reactor will be used, wherein the weight of the reactor does not play a role. In case of a centralized purification of gas flows, a reactor having a large diameter may be useful in view of the pressure drop. In that case the weight of the reactor could become a problem.

A first possibility to reduce the weight of the reactor is to use a light metal having a high heat conductivity, namely aluminum. Aluminum spheres having a diameter of 2 to 5 mm are commercially available. As discussed above, these aluminum spheres can be sintered in high vacuum.

Another possibility to reduce the weight of the metal content of the reactor resides in the use of hollow spheres. Surprisingly it has been found that the thermal conductivity of the reactor is maintained even when hollow spheres are used, whereas also these slip of reactants along the reactor wall is effectively prevented.

Hollow spheres can be produced by starting from polystyrene spheres on the surface of which a layer of a powder of the metal to be used is applied. A subsequent thermal treatment in a reducing gas or reducing gas flow leads to the removal of the polystyrene and sintering of the metal powder, resulting in a hollow sphere. Sintering together of these spheres results in a reactor content having a substantially less weight.

According to a preferred embodiment the surface of the porous sintered metal in the reactor is provided with a silicon oxide layer by the use of silicon rubber which is dried, thermally decomposed and oxidized, as discussed in the references cited above. On or in this porous dioxide layer the catalytic active component may be applied. In case the metal has to be protected against aggressive compounds which may be present in the gas flow to be treated or that may be produced by oxidation thereof, first a thin silicium oxide layer may be applied in the manner discussed above, which is subsequently sintered in an inert or reducing gas at a temperature of about 700° C. or higher to a non-porous closed layer. On top of this closed layer it is either possible to apply a porous silicium dioxide layer and therein the active component or it is possible to apply the catalytically active component directly on the closed, non-porous layer.

In a preferred embodiment a precious metal compound, such as platinum, is mixed with a solution of silicon rubber in for example ethyl acetate. In general one will use an organo metal compound of the precious metal, as such compound can be mixed very well with the silicon rubber solution. Surprisingly, it has been found that with thermal decomposition and oxidation of the rubber very fine divided previous metal particles are precipitated into the resulting silicium dioxide layer. Such precious metal particles turn out to have a very high catalytic activity.

The present invention is very important for the removal from gas flows of volatile organic compounds, as discussed above. Further it is also very interesting to use the process for the removal of bacteria, viruses and dust particles which may give rise to allergic reactions. For this embodiment it is especially useful to have a catalytically active gauze, which is electrically heated. The viruses, bacteria and dust particles leave a carbon containing residue which slowly oxides at normal use temperature of the gauze. Generally this will not lead to a decrease of the pressure drop. In addition thereon, in case the pressure drop nevertheless becomes too large, it is possible to heat the gauze to a much higher temperature, thereby oxidizing the carbonic residues.

The process of the application finds use in various embodiments wherein gas flows having relatively low amounts of contaminants have to be purified. An especially interesting embodiment is the situation of the purification and recirculation of gases in airplanes and other close environments, wherein it is important to recirculate the gas (air). Especially interesting for airplanes is the embodiment wherein any additional heat is not provided by burners, but by electrical heating, either using conventional heating means or electrically gauzes.

The invention is now elucidated on the basis of the figures wherein various embodiments of the invention are described in a non-limiting manner.

Figure 2:
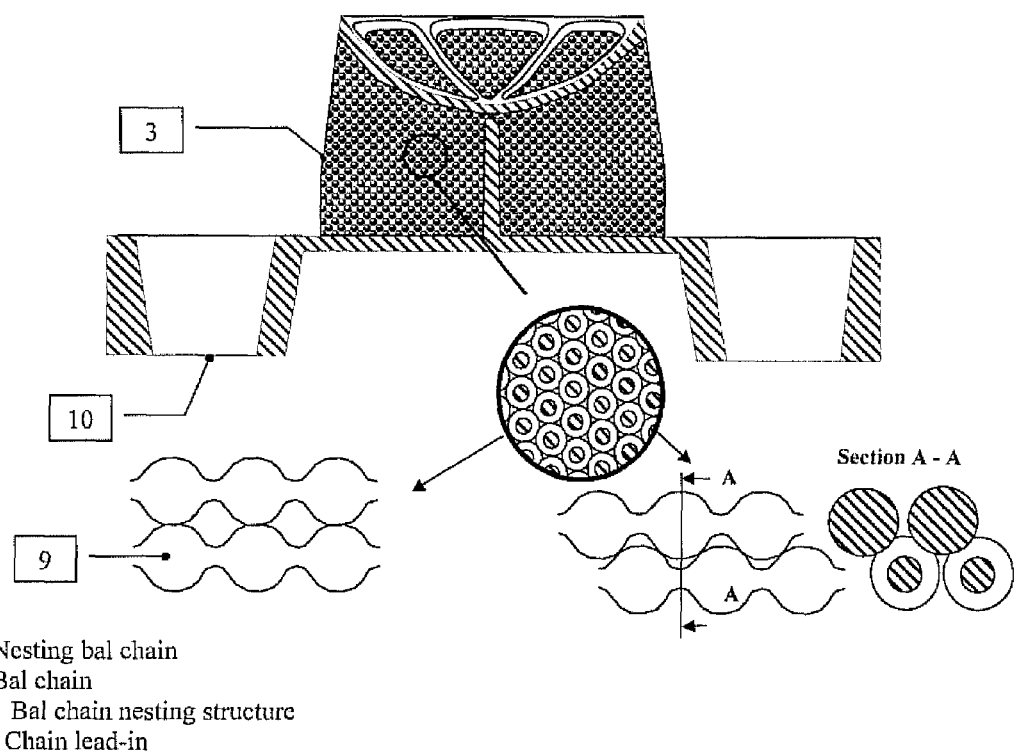
Figure 3:
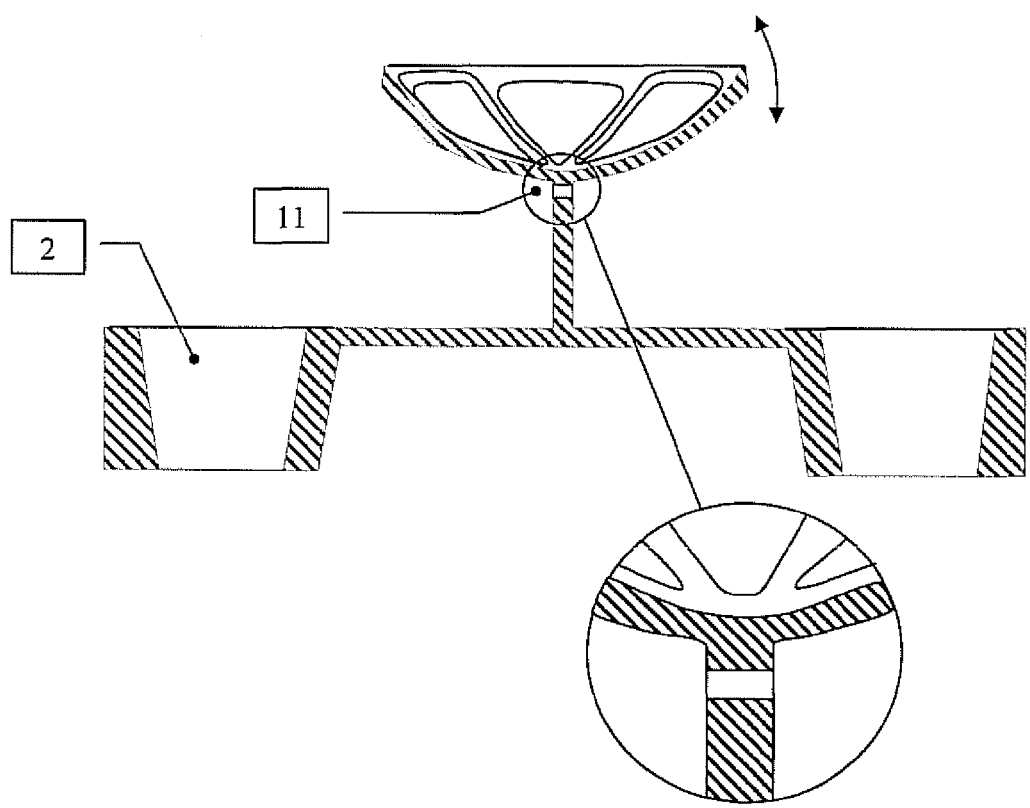
Figure 4:
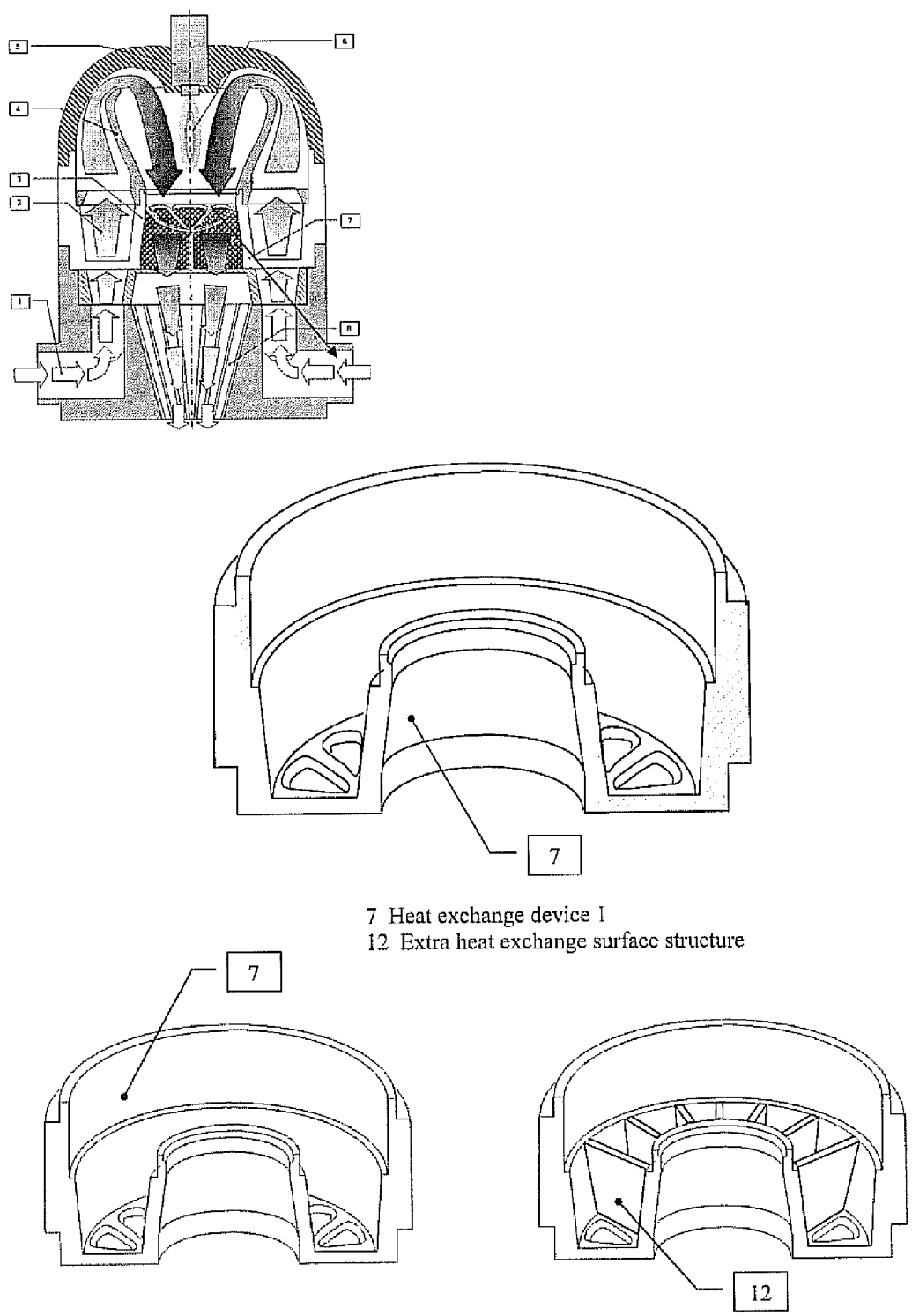
Figure 5:
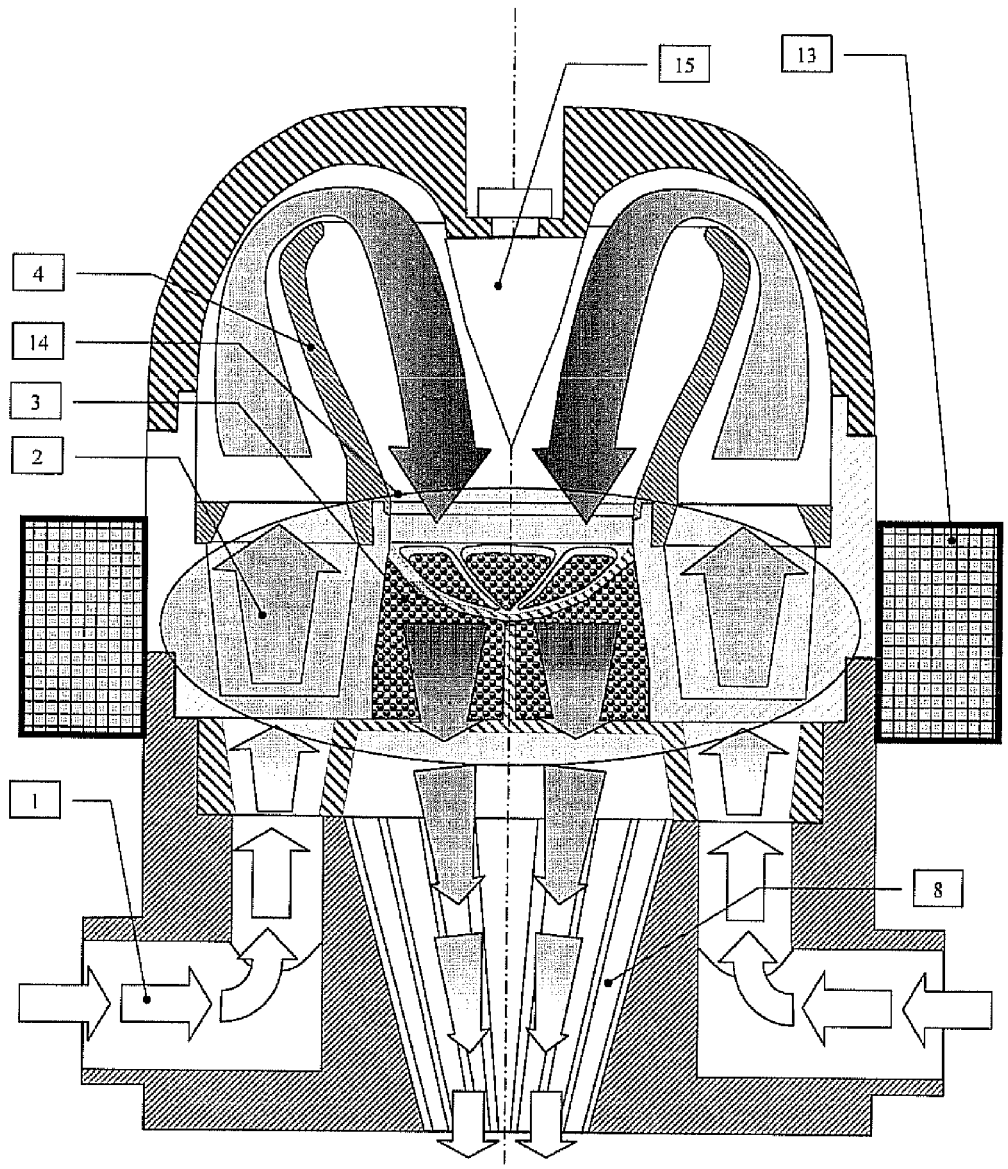
Figure 6:
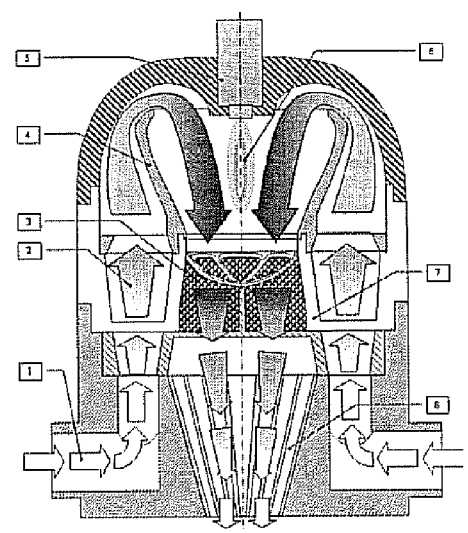
Figure 6:
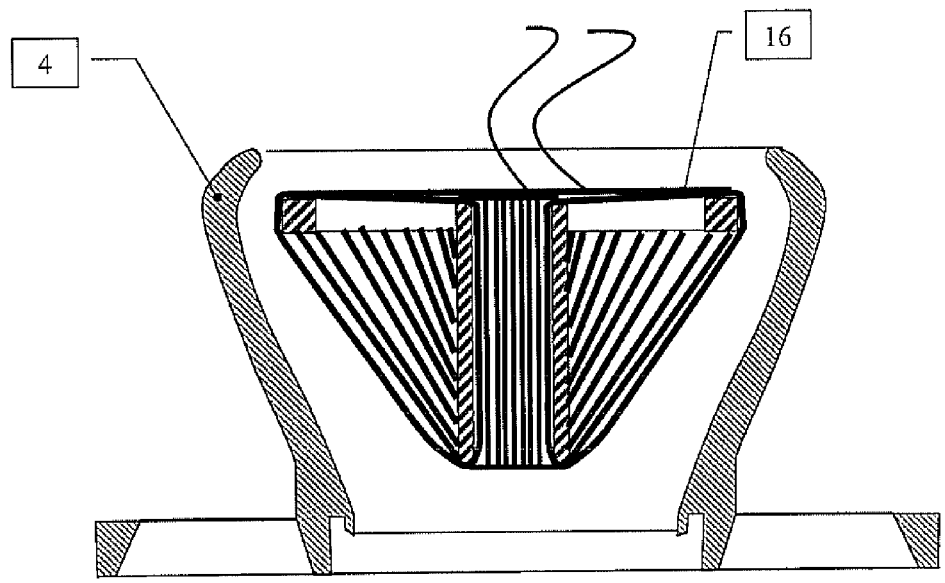
Figure 6:
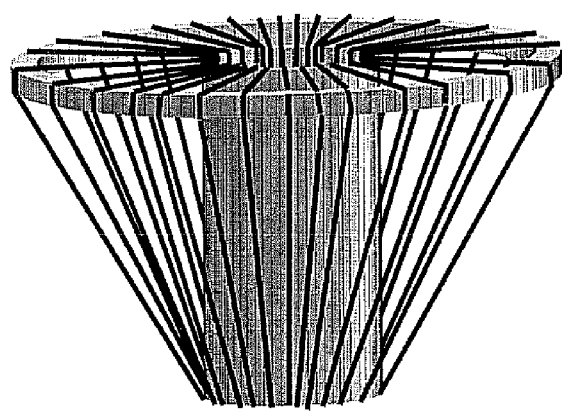
Figure 7:
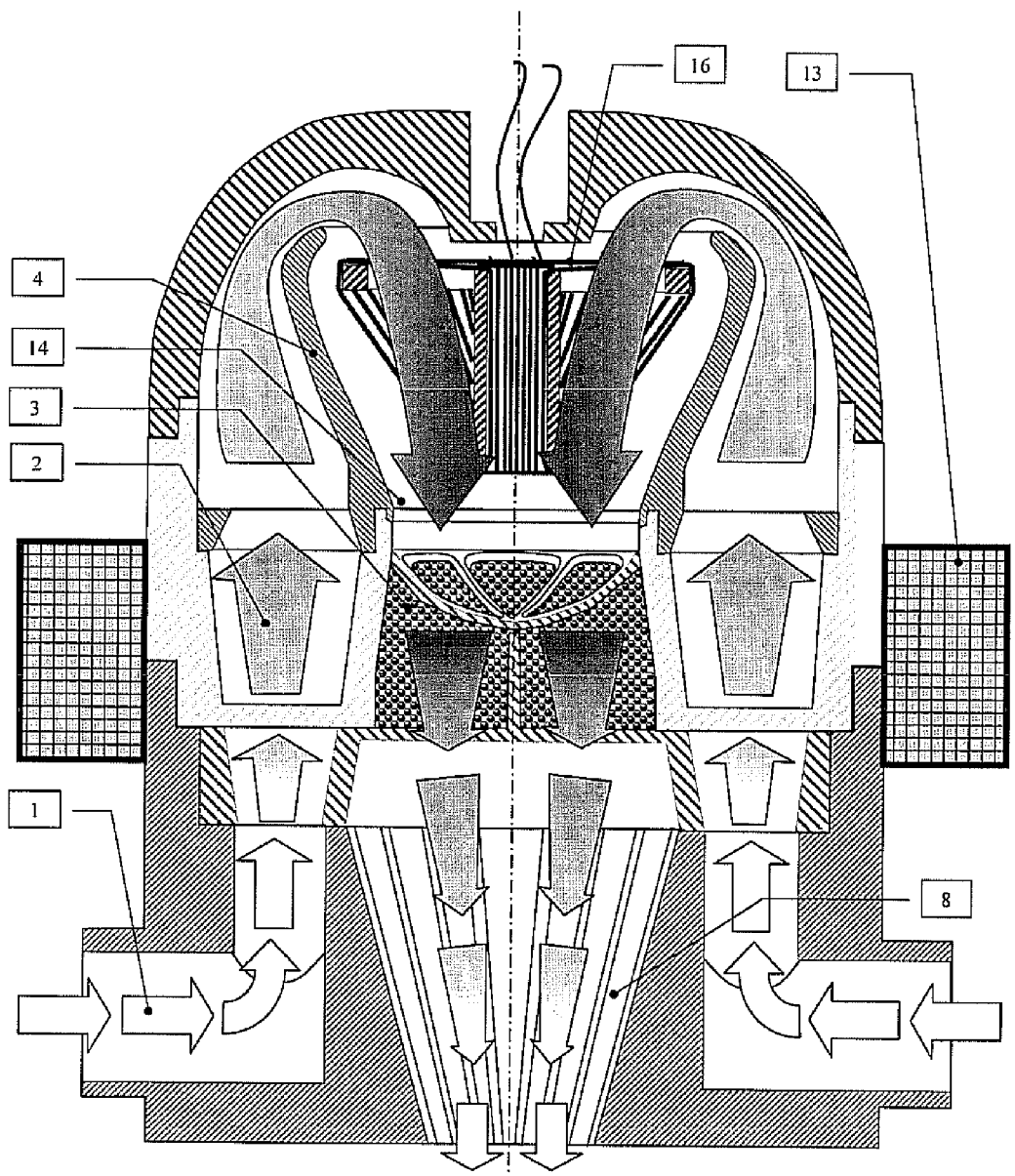
Figure 8:
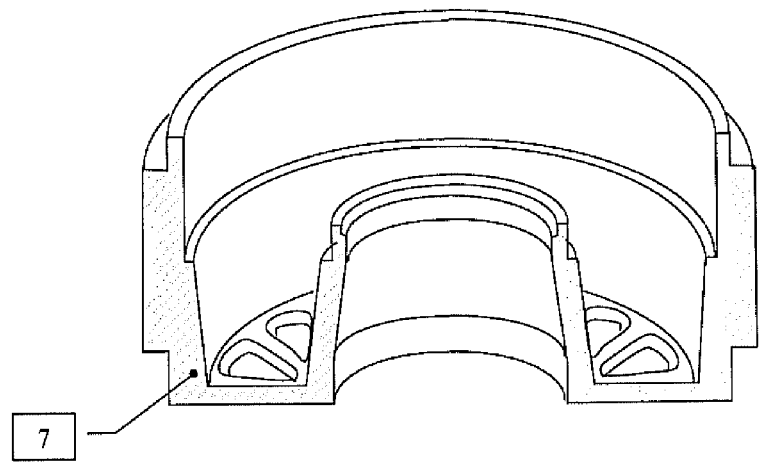
Figure 8:
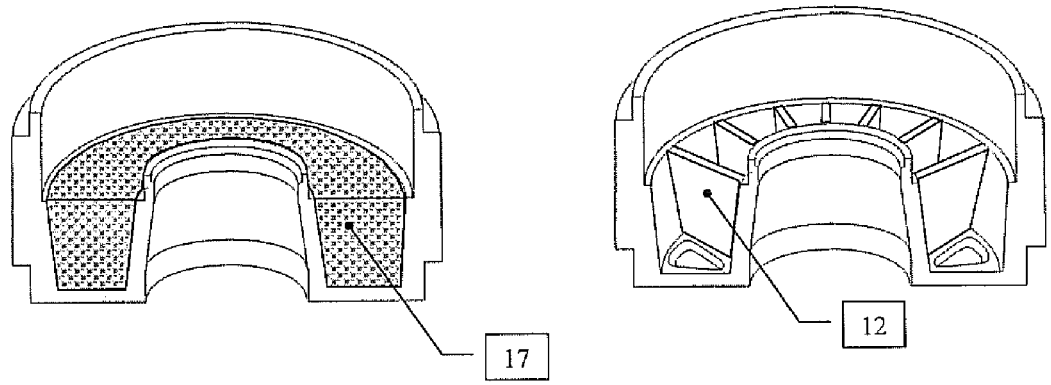
Figure 9:
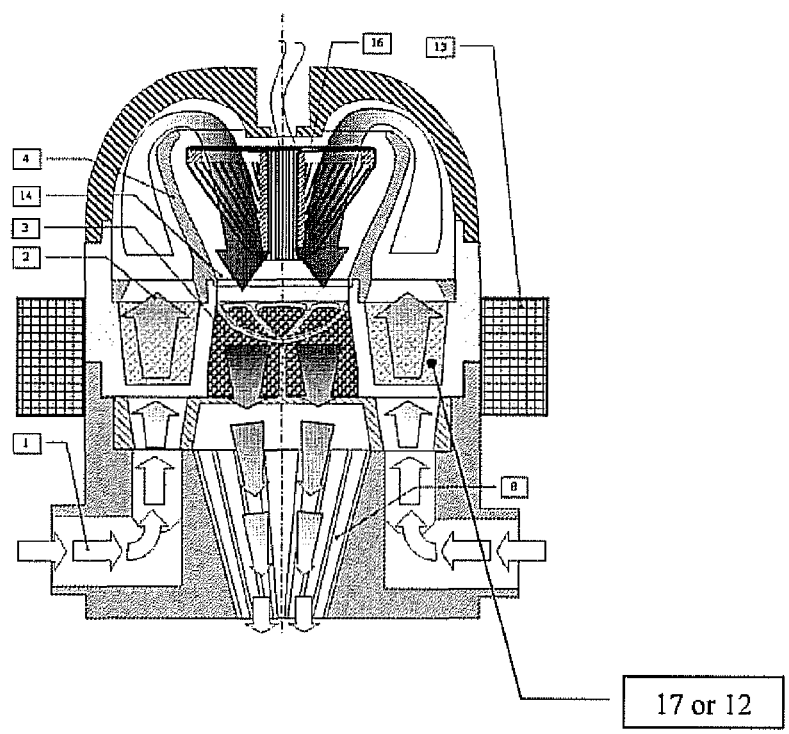
Figure 9:
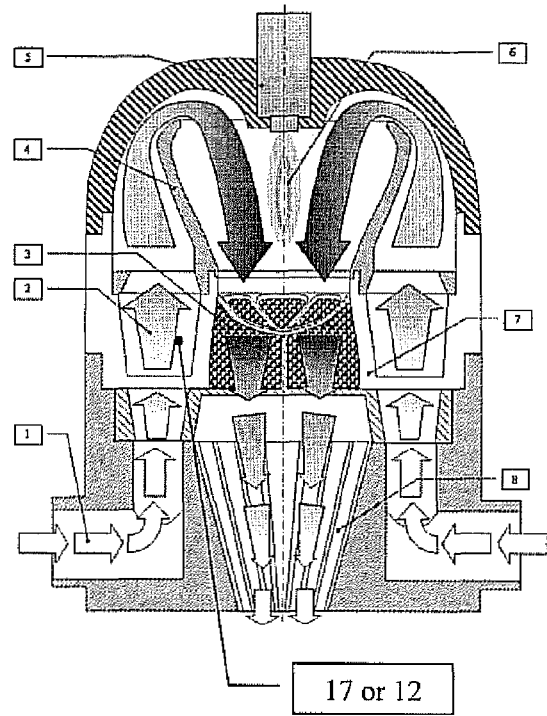
Figure 10:
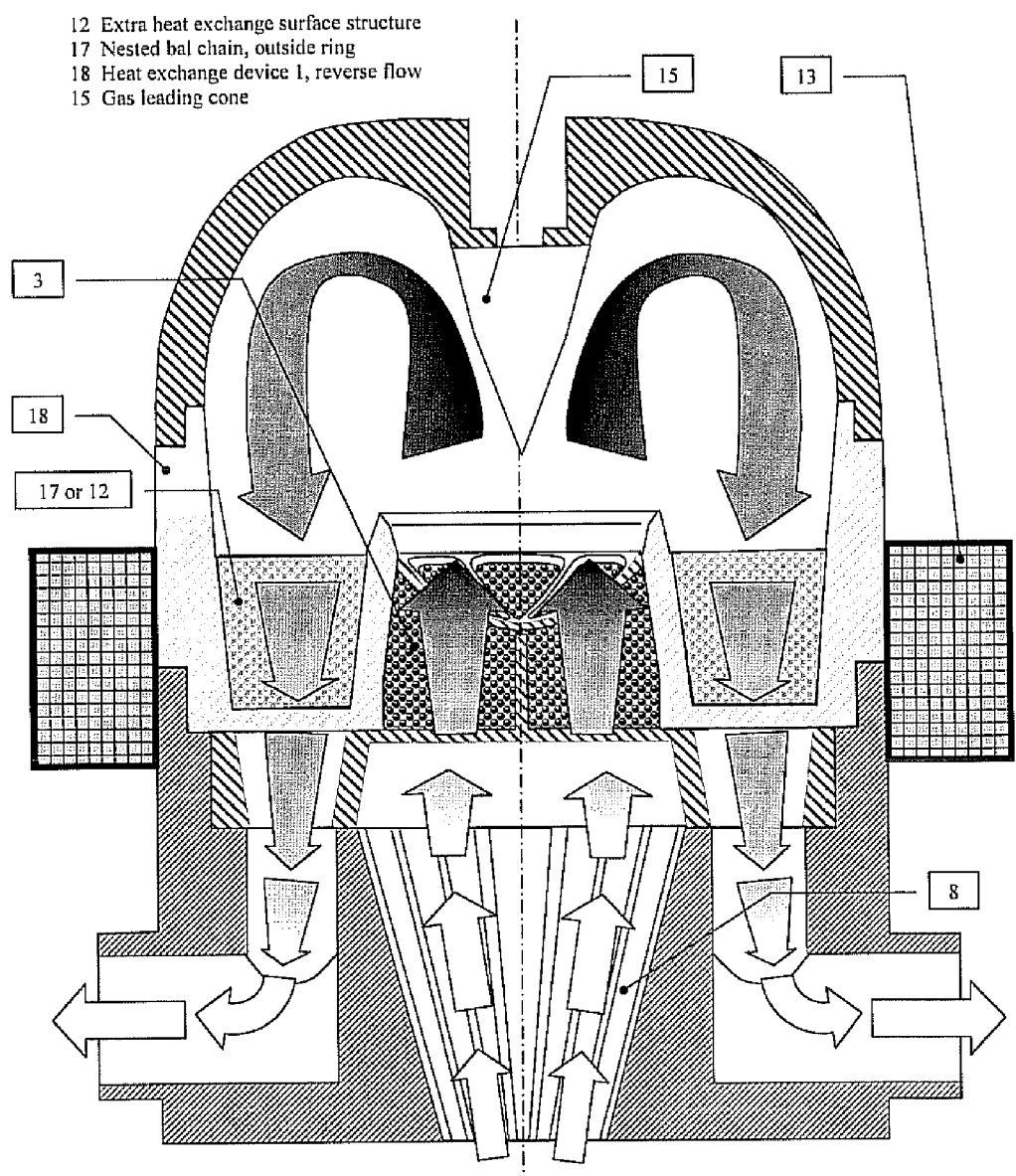

In the figures, the following is described:

FIG. 1 gives a full view of a reactor of one embodiment according to the invention;

FIG. 2 gives a blow-up of the nested ball chain (3) of FIG. 1;

FIG. 3 gives a further detail of the chain lead-in (11) of FIG. 2;

FIG. 4 gives an enlarged detail of the heat exchange device (7) of FIG. 1;

FIG. 5 gives a full view of a reactor of another embodiment according to the invention;

FIG. 6 gives details of the electric heater (13) according to FIG. 5;

FIG. 7 gives a full view of a reactor of yet another embodiment according to the invention;

FIG. 8 gives details of the heat exchange device (1);

FIG. 9 shows different embodiments of the reactor;

FIG. 10 gives the reactor of FIG. 5, with a reverse flow; and

Figure 11:
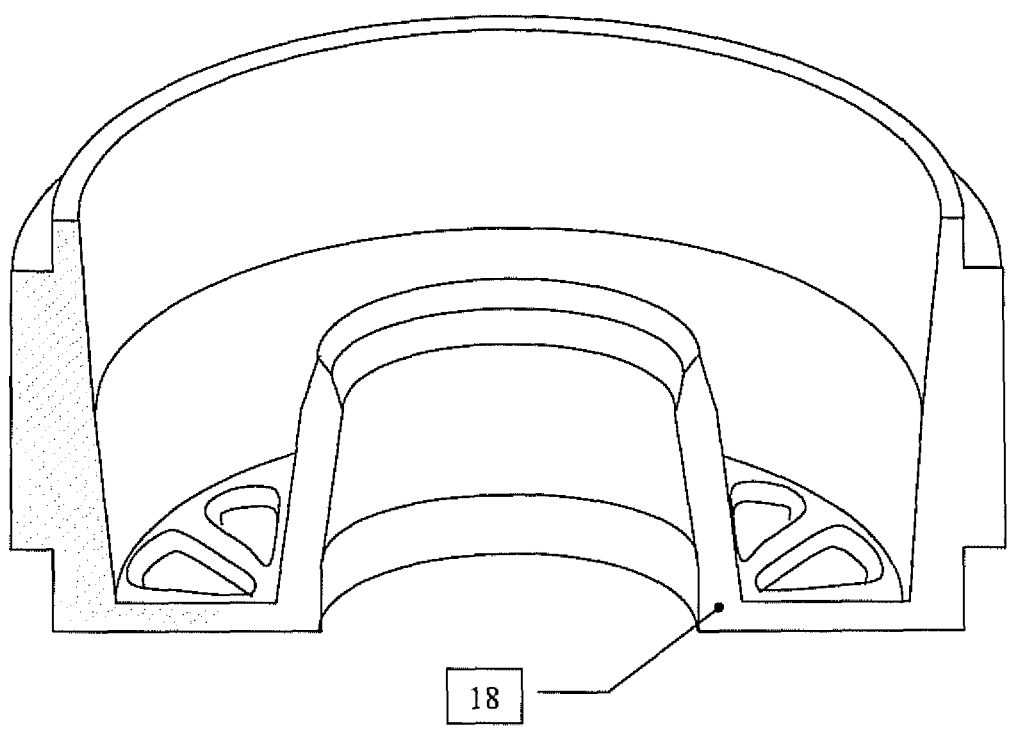

FIG. 11 shows that a different heat exchange device (7) is required with a different direction of the gas flow.

In FIG. 1 a reactor according to one embodiment of the invention is described. In this embodiment the heating occurs using a burner between the two compartments. The cold gas is introduced via cold gas inlet (1) and the gas is preheated in section (2) by heat exchange (7) with nested ball chain (3). Along gas leading cup (4) the preheated gas is heated by gas burner (5) and flame (6). The hot gas passes through nested ball chain (3) where it gives off part of its heat. In heat exchange device (8) the remainder of the heat is transferred to the entering cold gas.

In FIG. 2 details of the nested ball chain (3) and its structure (10) are given. The sintered metal structure is given with two possible structures and a cross-section thereof. The nesting ball chain may be wired in different ways, which has an influence on the contact surface (heat exchange and electrical conductivity) and the flow surface (flow rate).

In FIG. 3 details of the lead-in (11) of the nested ball chain (3) are shown.

In FIG. 4 details of the heat exchange device (7) are shown, without and with extra heat exchange surface structures (12).

In FIG. 5 a reactor according to another embodiment of the invention is shown. In this embodiment the heating occurs with an electrical heater (15), and an optional coil heater (13) around the heat exchange zone (7).

In FIG. 6 an electrical filament heater is shown, with details of the actual filament heater (FIG. 6B).

In FIG. 7 a reactor is shown, with the filament heater of FIG. 6.

In FIG. 8 details of the heat exchange device (1) are shown;

In FIG. 9 two embodiments of the reactor of the invention are shown.

In FIG. 10 a reactor is shown, wherein the flow is reverse compared to the reactors of the previous figures.

In FIG. 11 a heat exchange device (18) suitable for use in the reactor of FIG. 10 is shown.

The invention claimed is:

1. Process for removing organic compounds from gas flows, in which process the said gas flow is passed through a first compartment of a multi-compartment reactor, which reactor comprises at least one first compartment and at least one second compartment, which first and second compartments are in heat exchanging relationship with each other through a joint, gas-tight wall, and in which first compartment the gas flow is heated by heat exchange with the said second compartment, passing the heated gas flow to the second compartment, further heating the gas flow entering the second compartment either by adding additional combustible gas or electric heating, and passing the heated gas through the second compartment over a catalytic oxidation catalyst to combust the organic compounds, whereby both the first and the second compartment are filled with porous sintered metal material, which is in heat exchanging relationship to the said joint wall, whereby the metal material in the second compartment is provided with the said oxidation catalyst.

2. Process according to claim 1, wherein the further heating is done by injecting a combustible gas in the gas flow and igniting this combustible gas, the gas preferably having been selected from gaseous hydrocarbons.

3. Process according to claim 1, wherein the temperature of the gas flow in the second compartment is between 100 and 300° C.

4. Process according to claim 1, wherein the oxidation catalyst comprises a precious metals.

5. Process according to claim 1, wherein the said further heating is in a separate catalyst bed, located at the entrance of the second compartment.

6. Process according to claim 1, wherein the gas flow is passed through a heated metal gauze for said further heating.

7. Process according to claim 6, wherein said metal gauze captures and removes virus, bacteria and dust from the gas flow.

8. Process according to claim 7, wherein said metal gauze is heated to combust carbonaceous residues form the gauze, when the pressure drop has become too high.

9. Reactor suitable for use in the process of claim 1, comprising comprises at least one first compartment and at least one second compartment, which first and second compartments are in heat exchanging relationship with each other through a joint, gas-tight wall, and in which first compartment a gas flow can heated by heat exchange with the said second compartment, means for passing the heated gas flow from the first compartment to the second compartment, and wherein means are present for further heating the gas flow entering the second compartment either by adding additional combustible gas or electric heating, the second compartment being provided with a catalytic oxidation catalyst to combust the organic compounds, whereby both the first and the second compartment are filled with porous sintered metal material, which is in heat exchanging relationship to the said joint wall, whereby the surface of the metal material in the second compartment is catalytically active for the said oxidation.

10. Reactor according to claim 9, wherein a metal gauze, with means for electrical heating thereof is present as means for said further heating.

\* \* \* \* \*

UNITED STATES PATENT AND TRADEMARK OFFICE
CERTIFICATE OF CORRECTION

| | | |
|---|---|---|
| PATENT NO. | : 9,101,880 B2 | Page 1 of 1 |
| APPLICATION NO. | : 13/203291 | |
| DATED | : August 11, 2015 | |
| INVENTOR(S) | : John Wilhelm Geus et al. | |

It is certified that error appears in the above-identified patent and that said Letters Patent is hereby corrected as shown below:

TITLE PAGE

Item 73 should read - "Assignee: K.M.W.E. Management B.V., Eindhoven (NL)"

Signed and Sealed this
Fifth Day of July, 2016

Michelle K. Lee
*Director of the United States Patent and Trademark Office*